3,067,261
THE PREPARATION OF POLYNITRO DERIVATIVES OF METHANE

Howard G. Clark, Decatur, Ala., Charles W. Plummer, Rockland, Mass., and Sandor A. Hoffmann, Bayonne, N.J., assignors, by mesne assignments, to the United States of America as represented by the Secretary of the Navy
No Drawing. Filed June 19, 1956, Ser. No. 592,468
9 Claims. (Cl. 260—644)

This invention relates to the preparation of polynitroparaffins and more particularly to the preparation of polynitro derivatives of methane.

Polynitro derivatives of methane have proven useful in many fields. Tetranitromethane is used as an additive for diesel fuels to increase their ignitability. Because it has the power of combining with many unsaturated hydrocarbons to give colored addition products, it is used as a reagent for the detection of such substances. This same compound, while very stable by itself, burns explosively when mixed with substances rich in carbon such as hydrocarbons and so is useful as an ingredient in high explosive mixtures. As an oxygen carrier of high specific gravity tetranitromethane is useful as a substitute for nitric acid as one of the fuels for liquid fuel rockets. It is also useful as nitrating agent and is used in the preparation of nitroform. Along with nitroform, tetranitromethane is used as an intermediate in the preparation of new high explosives such as bistrinitroethylnitramine.

No satisfactory process is known for the large scale production of the polynitro derivatives of methane. Nitroform is usually obtained from tetranitromethane by the elimination of one of the nitro groups. However, processes for the production of tetranitromethane have not proven to be economically feasible. This compound is usually obtained by the reaction of nitric acid on either acetic-anhydride or acetylene. With either process large quantities of waste gases are evolved which must be disposed of. In addition these processes are very costly in view of the small yields obtained thereby. The sulfuric-nitric acid mixture ordinarily used for the nitration of aromatic hydrocarbons in the liquid phase has not been considered suitable for nitrating the lower paraffins. Primary nitroparaffins are quickly hydrolyzed by hot sulfuric acid and secondary and tertiary isomers are converted to brown tars. Vapor phase nitration of saturated hydrocarbons with either nitric acid or nitrogen dioxide does not produce polynitro compounds but only mononitroparaffins.

The process which is the subject of this invention provides a method of preparing polynitro derivatives of methane which does not require the use of high temperatures and is safe economical and readily adaptable for large scale industrial use.

It is therefore an object of the present invention to provide a new and useful improved process for the preparation of polynitro derivatives of methane.

Another object of the invention is to provide a new and useful process for the preparation of polynitro derivatives of methane which results in a high yield and is economically feasible for large scale industrial use.

A further object is to provide a process for the preparation of polynitro derivatives of methane which is safe and does not require the use of high temperatures and pressures.

Other objects and many of the attendant advantages of the invention will become apparent to those skilled in the art as the disclosure is made in the following detailed description.

The improved process which is the subject of this invention involves the reaction of amides of malonic acid with concentrated nitric acid in the presence of sulfuric acid. In accordance with the invention the amide of malonic acid, in solution with sulfuric acid, is slowly added to the nitrating mixture of fuming nitric acid and sulfuric acid.

The products of the reaction are determined by the composition of the nitrating mixture and the temperature at which the reaction is allowed to proceed.

The reaction is comparatively rapid the full yield being obtained in approximately three hours of heating after the exothermal stage of the reaction is finished. The reaction is easily controlled and may be run as a continuous process. The rate of addition of the amide to the nitrating mixture and the temperature at which the reaction is allowed to proceed govern the rate of heat evolution. The desired rate of reaction may be maintained for a reactor of almost any size and cooling rate. If the reaction temperature is kept at about 65° C. the exothermal reaction is completed as fast as the materials are mixed.

The extent of the nitration of the end product may be controlled by regulating the concentration of the sulfuric acid in the nitrating mixture and controlling the temperature of the reaction. In general the lower the concentration of sulfuric acid and the lower the temperature the less the extent of nitration of the end product. A nitrating mixture of two parts 90% nitric acid and one part 96% sulfuric acid kept at approximately 55° C. for three hours will give a yield of substantially 58% of nitroform with no formation of tetranitromethane. The use of 20 to 30 percent oleum in the nitrating mixture and an increase in the temperature of the reaction results in a greater proportion of tetranitromethane in the reaction product.

During the later stages of the reaction there is a phase separation. The lighter phase contains tetranitromethane, nitroform, lower nitration products and nitric acid. It is most important that the reaction mixture be well stirred to insure that the lower nitration products come into contact with the nitrating solution.

The monoamide and the diamide of malonic acid may be used as the starting material in the process of this invention. When pure malonamide is used yields of up to 50% of pure tetranitromethane may be obtained. If malonamide is not available cyanoacetamide may be converted to malonamide by dissolving the cyanoacetamide in sulfuric acid to which the theoretical amount of water needed to give malonamide has been added and allowing the solution to stand for about one hour. It has been found that this solution may be nitrated to give a 30% yield of tetranitromethane. Cyanoacetic acid may be used in the same fashion. The cyanoacetic acid may be converted to the half-amide of malonic acid by dissolving the cyanoacetic acid in concentrated sulfuric acid to which enough water has been added to transform the cyano group into a carbamide group.

Alpha nitration appears to be the first step in the formation of the polynitro methane compounds from the amides of malonic acid. The nitronium ion [NO$_2^+$] has been shown to be present in the nitric-sulfuric acid mixture as follows:

$$H_2SO_4 + HNO_3 \rightleftharpoons HSO_4^- - H_2NO_3^+$$
$$H_2SO_4 + H_2NO_3^+ \rightleftharpoons HSO_4^- - H_3O^+ + NO_2^+$$

One or both of the alpha-hydrogens of the amide are replaced by nitro groups. The amide groups are converted into carboxylic groups and these along with the carboxylic groups originally present are split off. The resulting anionic intermediate combines with the nitronium ion and the net result is an exchange of carboxylic or amide groups for nitro groups. It is assumed that the greater reactivity of the alpha hydrogen of the amides of malonic acid is responsible for the successful nitration. By greater reactivity is meant a more extensive acid ionization of the alpha-hydrogen causing a higher electron density around the alpha-carbon atom. This, in turn, makes the attachment of the positively charged nitronium ion to this carbon atom more probable. Only those derivatives of malonic acid which possess alpha-hydrogens of sufficient acidity can be nitrated to polynitro compounds.

methane continued. The solution was then chilled to 15° C. and poured over 600 ml. of mixed ice and water. The crude tetranitromethane was separated and washed three times with an equal volume of water and once with an equal volume of concentrated sulfuric acid. The weight of pure tetranitromethane was 25.0 g. or 42.5% of the theoretical yield from malonamide. The freezing point of this material was 13.4° C.

Table I shows the results obtained by utilizing similar procedures with reagents of various concentrations.

*Table I*

| | Malonamide | $HNO_3$ | $H_2SO_4$ | Temp | Yield, Percent |
|---|---|---|---|---|---|
| 1 | 5.10 g. in 10 ml. of $H_2SO_4$ | 20 ml. of 90% | 20 ml. of 25% fuming | 50–55° C. during add., 60–65° C. for 2½ hrs | 46 |
| 2 | 30.6 g. in 60 ml. $H_2SO_4$ | 120 ml. of 90% | 90 ml. of 25% fuming | 60° C. during add., 60° for 4½ hrs | 45 |
| 3 | 5.10 g. in 10 ml. $H_2SO_4$ | 20 ml. of 100% | 6 ml. of 25% fuming | 60°–65° C. during add., 68° C. for 5 hrs | 37 |
| 4 | 33.2 g. in 65 ml. $H_2SO_4$ | 130 ml. of 90% | 65 ml. of 65% fuming | 60°–65° C. during add., 60–65° C. for 4½ hrs | 34 |
| 5 | 5.10 g. in 10 ml. $H_2SO_4$ | 20 ml. of 90% | 5 ml. of 25% fuming | 60°–65° C. during add., 70° C for 5 hrs | 32 |

The tetranitromethane product may be isolated by drenching the reaction mixture in ice water. As an alternative method the two phase reaction mixture may be subjected to a vacuum of 20 mm. at room temperature and gradually heated to 50° C. The volatile material is then condensed in a Dry-Ice chilled receiver. This condensation product consists of tetranitromethane, some nitroform and nitric acid. The nitroform may be readily purified by extracting the mixture with chloroform, washing the chloroform solution with sulfuric acid to remove the nitric acid and then extracting the chloroform solution with water to give an aqueous solution of nitroform.

Reversal of the mode of addition of the amide to the nitrating mixture should be avoided. A fume off results after the addition of 5% of the nitric acid to the amide solution. Care should also be taken in applying heat to the reaction mixture. The reaction should be watched closely when heating is begun to make sure the exothermal stage of the reaction is finished.

The process of the invention may best be understood by reference to the following examples which are described by way of illustration and are not to be considered as limiting the invention.

EXAMPLE I

A nitrating mixture made by mixing with cooling 120 ml. of nitric acid [General Chemical Co., technical, 90% assay] and 90 ml. of 20% oleum, was placed in a 500 ml. three necked flask equipped with a liquid sealed stirrer, addition funnel, and an adapter holding a condenser and a thermometer. To this nitrating mixture a solution of 30.6 g. [0.3 mole] of malonamide [M.P. 164–165.5° C.] in 60 ml. of sulfuric acid was added over a period of 45 minutes with the temperature maintained at 60° C. by air cooling. The addition was accompanied by vigorous evolution of gas. After the addition was completed the temperature began to drop slowly and the rate of evolution of gas decreased. The solution was stirred for one half hour. It was then heated to 60° C. with an oil bath and maintained at this temperature for 4.75 hours. After one hour of heating a second liquid phase began to appear. This layer increased in volume as the formation of the tetranitro- To 30 ml. of concentrated sulfuric acid in a 125 ml. Erlenmeyer flask 15.3 g. [0.15 mol] of malonamide was added with stirring and cooling. This solution was added dropwise to 60 ml. of 90% nitric acid in a 500 ml. three-necked flask equipped with a stirrer, reflux condenser and thermometer. The nitric acid was preheated to 50° C. to get the reaction to start smoothly. By cooling with a water bath and regulating the rate of addition of malonamide solution the reaction temperature was maintained at 55° C. throughout the addition. After completing addition, the water bath was removed and the reaction mixture was allowed to stand ½ hour. The temperature dropped to 40° C., and gas evolution almost ceased. The solution was then heated to 52° C. with an oil bath and maintained at this temperature ±2° for three hours. The solution was then cooled to 15° C. and poured over 200 ml. of mixed ice and water. The solution was diluted to 500 ml. and 5 ml. of aliquot portions analyzed for nitroform by precipitation of the potassium salt at pH 7 and by precipitation in 1N acetic acid. The yield of nitroform was 0.087 mol or 58% with no detectable concentration of dinitromethane.

EXAMPLE III

The reaction was carried out as given in Example II and the reaction mixture was extracted with 75 ml. portions of chloroform instead of being diluted with ice water. Five ml. of this solution was extracted with 10% sodium hydroxide solution which quantitatively removed the nitroform. Gravimetric analysis of this portion showed that the total chloroform solution contained 0.065 mol. of nitroform. The balance of the chloroform solution was extracted with 10 ml. of concentrated sulfuric acid and then another 5 ml. portion was extracted and analyzed. The yield of pure nitroform in the chloroform solution was 0.060 mol or 40%.

Table II shows the results obtained by utilizing similar procedures for reagents of different concentrations at different temperatures.

*Table II*

| | Malonamide | $HNO_3$ | $H_2SO_4$ | Temp. | Nitroform Yield, Percent |
|---|---|---|---|---|---|
| 1 | 5.10 g. in 15 ml. $H_2SO_4$ | 4.2 ml. of 100% | 9 ml. of 25% fuming | 55°–60° C. for 2¾ hrs | 49 |
| 2 | 5.10 g. in 12 ml. $H_2SO_4$ | 9.0 ml. of 100% | 2.8 ml. of 25% fuming | 50°–60° C. for 1 hr | 56 |

EXAMPLE IV

Cyanoacetic acid [21.25 g. or 0.25 mol] was added with cooling and stirring to a solution of 50 ml. of concentrated sulfuric acid and 4.5 ml. [0.25 mol] of water to transform the cyano group to a carbamide group. The temperature was not allowed to rise above 15° C. After solution was complete, the mixture was allowed to warm to room temperature for one hour. There was some gas evolution during this time. The solution was then added dropwise to a nitrating mixture made up of 100 ml. of 90% nitric acid and 100 ml. of 25% fuming sulfuric acid which was contained in a 500 ml. three-necked flask equipped with a stirrer, a reflux condenser and an adapter which held an addition funnel and a thermometer. The nitrating mixture was preheated to 50° C. and not allowed to rise above 60° C. during the addition. After completion of the addition, the solution was heated at 90° C. for one and one-half hours. It was then chilled to 15° C. and poured over 500 ml. of ice and water. The water layer became bright blue. After washing the water insoluble layer three times with its own volume of water and once with 5 ml. of concentrated sulfuric acid, the tetranitromethane weighed 15.2 g. and froze at 13.0° C. This represented a yield of 30% of the theoretical amount of product available.

EXAMPLE V

Cyanoacetamide [20.4 g.] was dissolved in 50.0 ml. of concentrated sulfuric acid to which the theoretical amount of water [1.7 ml.] needed to give malonamide had been added. The solution was allowed to stand for one hour. The solution was then slowly added to a nitrating mixture made up of 100 ml. of 90% nitric acid and 75 ml. of 25% fuming sulfuric acid. The nitrating mixture was maintained at 65° C. during the addition and for four hours thereafter. This solution gave a 30% yield of tetranitromethane. This yield may be increased by increasing the temperature of the reaction mixture up to 90° C. after the exothermal portion of the reaction has been completed.

The presence of strong sulfuric acid in the nitrating mixture does not appear to be necessary for the preparation of nitroform from malonamide. The sulfuric acid when present acts as a dehydrant and maintains a system of proper acidity to increase the reaction rate. However, nitroform was prepared from malonamide without the presence of sulfuric acid. The results are set forth in Table III below.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The method of preparing polynitro derivatives of methane comprising reacting an unsubstituted amide of malonic acid with concentrated nitric acid at 50–90° C. for 1–5 hours.

2. The method of preparing polynitro derivatives of methane comprising nitrating the half amide of malonic acid with concentrated nitric acid at 50–90° C. for 1–5 hours.

3. The method of preparing polynitro derivatives of methane comprising reacting an unsubstituted amide of malonic acid with concentrated nitric acid in the liquid phase at 50–90° C. for 1–5 hours.

4. The method of preparing tetranitromethane comprising reacting at 50–90° C. for 1–5 hours an unsubstituted amide of malonic acid with fuming nitric acid mixed with concentrated sulfuric acid.

5. The method of preparing tetranitromethane comprising reacting amide of malonic acid with fuming nitric acid mixed with fuming sulfuric acid at 50–90° C. for 1–5 hours.

6. The method of preparing tetranitromethane comprising reacting at 50–90° C. for 1–5 hours an unsubstituted amide of malonic acid with fuming nitric acid mixed with fuming sulfuric acid.

7. The method of preparing tetranitromethane comprising reacting the half amide of malonic acid with fuming nitric acid mixed with fuming sulfuric acid in the liquid phase at 50–90° C. for 1–5 hours.

8. The method of producing polynitro derivatives of methane comprising the steps of slowly adding a solution of an unsubstituted amide of malonic acid to a mixture of fuming nitric acid and fuming sulfuric acid, and maintaining the temperature of the mixture at 50–90° C. during the addition and subsequently for 1–5 hours until the reaction is completed.

9. The method of preparing polynitro derivatives of

*Table III*

| Malonamide | Nitric Acid | Temp. | Yield, percent |
|---|---|---|---|
| 15.3 g. in 30 ml. 70% HNO₃ | 60 ml. of 90% | 50–60° C., 3 hrs. room temp., 3 days | 20 |
| 15.3 g. in 30 ml. H₂SO₄ | do | 60–70° C., 4 hrs. room temp., overnight | 50 |
| Do | do | 50–55° C., 3 hrs | 58 |

From the foregoing detailed description it may be seen that a new and improved process for the preparation of polynitro derivatives of methane has been disclosed by which nitroform and tetranitromethane may be prepared safely and economically without recourse to high temperatures and pressures.

methane comprising reacting malonamide with fuming nitric acid at 50–90° C. for 1–5 hours.

References Cited in the file of this patent

UNITED STATES PATENTS 2,057,076    Wyler _____ Oct. 13, 1956